US006010655A

United States Patent [19]

Chen

[11] Patent Number: 6,010,655

[45] Date of Patent: Jan. 4, 2000

[54] METHOD OF MAKING A CERAMIC ORNAMENT HAVING SHORT UNDERCUTS ON SURFACE THEREOF

[75] Inventor: Lillian Chen, Taipei, Taiwan

[73] Assignee: Seagull Decor Co., Ltd., Taipei, Taiwan

[21] Appl. No.: 09/143,610

[22] Filed: Aug. 28, 1998

[51] Int. Cl.[7] .......... B29C 33/40

[52] U.S. Cl. .......... 264/227; 264/635

[58] Field of Search .......... 264/632, 635, 264/636, 637, 651, 679, 219, 220, 225, 226, 227

[56] References Cited

U.S. PATENT DOCUMENTS 3,816,572 6/1974 Roelofs .
4,808,360 2/1989 Natori et al. .......... 264/227
5,169,578 12/1992 Fukao .......... 264/86
5,190,702 3/1993 Johnson .......... 264/16
5,298,213 3/1994 Shyu .......... 264/227

*Primary Examiner*—Christopher A. Fiorilla
*Attorney, Agent, or Firm*—Dougherty & Troxell

[57] ABSTRACT

A method of making a ceramic ornament having short undercuts on a surface. A primary clay body is molded into a primary resin body by a silicone mold assembly. The primary resin body is then used to make upper and lower silicone mold assemblies. After slip is poured into the silicone mold assemblies, the plaster molding members will absorb moisture in the slip. Two clay body portions having a predetermined thickness are formed into shape. After removing the molding members and coating the connection line of the clay body portions with slip, the two silicone mold assemblies are combined. The two silicone mold assemblies will be formed into a complete figurative body upon the slip being dried. The figurative body is then fired at a high temperature so as to obtain a ceramic ornament having short undercuts and decorative threads on a surface.

6 Claims, 13 Drawing Sheets

(PRIOR)

METHOD OF MAKING A CERAMIC ORNAMENT HAVING SHORT UNDERCUTS ON SURFACE THEREOF

BACKGROUND OF THE INVENTION

1. Field of the Invention

This invention relates to a ceramic ornament, and particularly to a method of making a ceramic ornament having short undercuts on a surface thereof.

2. Description of the Prior Art

To mold a conventional ceramic ornament, a primary clay body is usually used for making a production mold assembly by means of plaster. After slip is poured into the plaster mold assembly, the plaster mold assembly will absorb the moisture in the slip; as soon as the clay body has a suitable thickness, the slip is poured out. After the clay body is dried to a condition of demolding, the clay body is removed from the plaster mold assembly to be formed into a complete ceramic ornament. The clay body is then fired to form a plain clay body. When plaster is used as a production mold assembly, an undercut part in the clay body should be avoided, and the split line of the mold has to be set exactly. Sometimes several split lines of the mold may be required so as to avoid an undercut. Further, in the case of the surface having dense short undercuts, the conventional plaster mold assembly cannot be used for mass production.

In the event the surface of a clay body has dense short undercuts, the mold assembly must be made of silicone. The surface of the clay body is coated with a thin layer of silicone to prevent the generation of bubbles. Then, the clay body is put in a suitable container, positioned therein properly, and a large amount of silicone slip is poured therein to eliminate the bubbles by means of a vacuum process. For the demolding operation, a suitable opening is cut after the silicone slip has set, and the primary clay body is taken out. Then, a silicone mold assembly is finished. The silicone mold assembly may be poured with a plaster slip or a resin slip. As soon as the slip has set, the body is removed from the mold and an ornament made of plaster or resin is finished. When using the silicone mold assembly, the slip can set, such as a plaster slip, which can be in dried condition permanently, i.e., to become hardened with moisture. When using resin, a hardening agent should be used and blended with the primary substance in order to have a hardening reaction.

SUMMARY OF THE INVENTION

The prime object of the present invention is to provide a method of making a ceramic ornament having short undercuts on a surface thereof.

Another object of the present invention is to provide a primary clay body having dense short undercuts on a surface thereof wherein a primary resin body is molded by means of a silicone mold assembly. By means of the primary resin body, at least two silicone mold assemblies are made. Each silicone mold assembly includes a bottom molding member, a silicone molding member with a mold cavity for pouring slip and positioning, and an upper molding member for absorbing moisture. The silicone molding member and the positioning bottom molding member are combined together, a suitable amount of slip is poured in the mold cavity, and then the upper molding member is mounted in position. The upper molding member is made of plaster for absorbing moisture so as to absorb moisture in the slip poured in the mold cavity. After setting, the upper molding member is removed, and slip is coated on the connection line of the clay body in the two silicone molding members, and the clay bodies are then combined. A complete figurative body will be finished upon the two half clay bodies being dried.

Still another object of the present invention is to provide a silicone molding member having a mold cavity to be poured with slip. The surface of the mold cavity is furnished with short undercuts, and when the slip is dried to the extent of demolding, the dense short undercuts will also be dried enough to demold from the silicone molding member. Then, a figurative body can be removed from the silicone molding member without damaging the short undercuts.

A further object of the present invention is to provide a figurative body out of the silicone mold assembly. The connection line of the two half clay bodies is coated with slip for connecting them together. Simultaneously, the short undercuts on the connection line can also be formed into shape upon coating the slip for connection. After demolding and trimming the connection line portion, the figurative body will be finished.

BRIEF DESCRIPTION OF THE DRAWINGS

FIG. 7 is a sectional view of the present invention, showing the thickness of slip poured in.

DETAILED DESCRIPTION OF THE PREFERRED EMBODIMENTS

Figure 1:
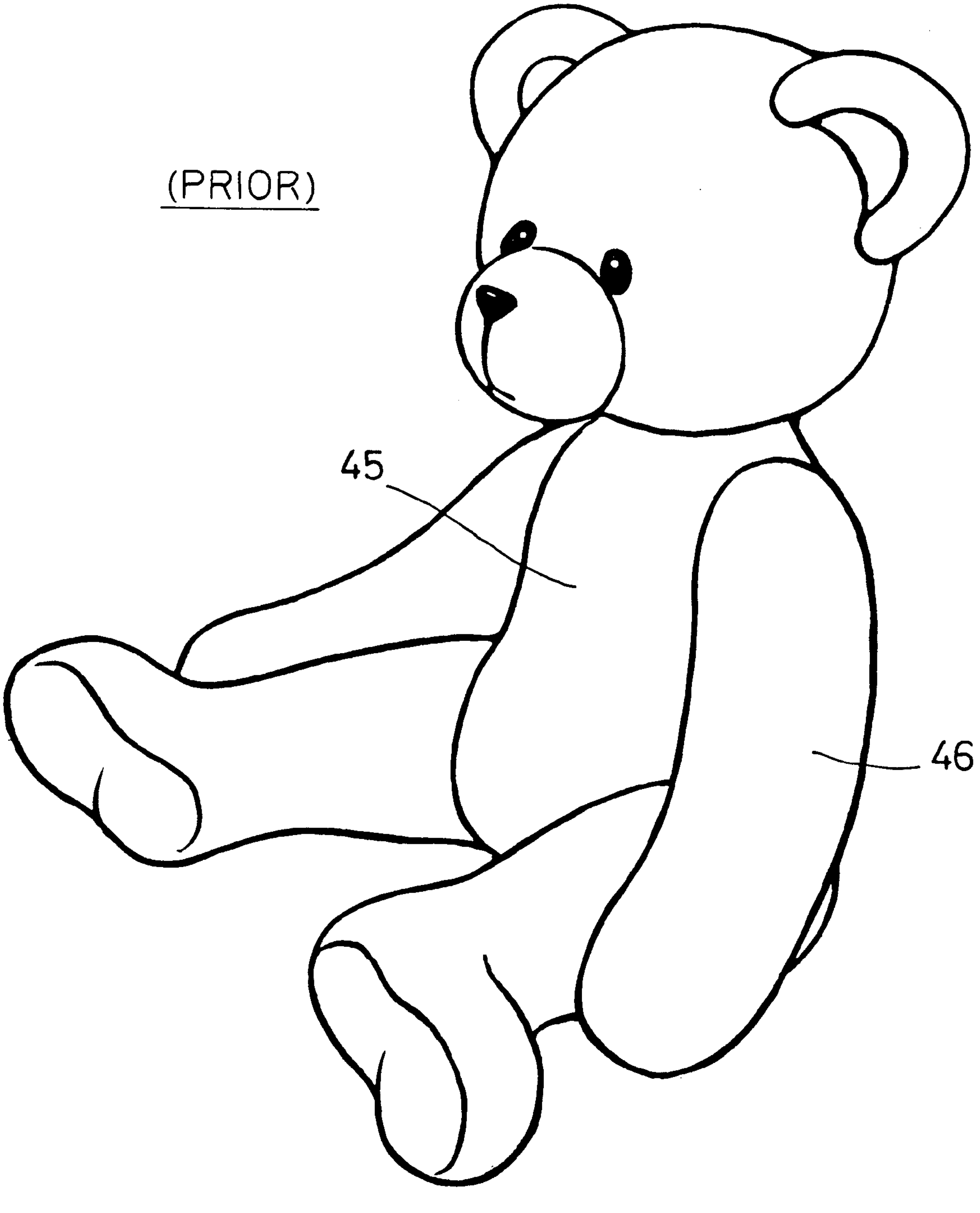
FIG. 1 is a perspective view of a conventional ceramic object.

This invention relates to a ceramic ornament having short undercuts on the surface thereof. As shown in FIGS. 4 to 13, the primary clay body 11 is furnished with a plurality of short undercuts on the surface thereof, and then the clay body is molded into a primary resin body 13 by using a silicone mold assembly 12. The primary resin body 13 is used to form two silicone mold assemblies 14 and 15, i.e., an upper one and a lower one. Each of the silicone mold assemblies 14, 15 includes a bottom molding member 41, 51, a silicone molding member 42, 52, and an upper molding member 43, 53. The silicone molding member 42, 52 and the bottom molding member 41, 51 are combined together. A suitable amount of slip is poured into mold cavity 24 of the silicone molding member 42, 52 before being assembled and locked together with the upper molding member 43, 53. The upper molding member 43, 53 is made of plaster, which will absorb the moisture of slip in the mold cavity 24 of the silicone molding member 42, 52 until the slip is dried and set enough for demolding. After the upper molding member 43, 53 of the silicone mold assemblies 14 and 15 is removed, the connection line of the clay half bodies in the two silicone molding members 42, 52 will be coated with slip for connection. As soon as the slip becomes dried, the two half bodies will be combined into a one piece figurative body. After removing the two bottom molding members 41, 51, the two silicone molding members 42, 52 will be separated from the figurative body; then, a complete clay body with short undercuts on a surface thereof is obtained. The figurative body will be fired at a high temperature to form into a plain clay body with short undercuts and decorative threads on the surface thereof.

Figure 2:
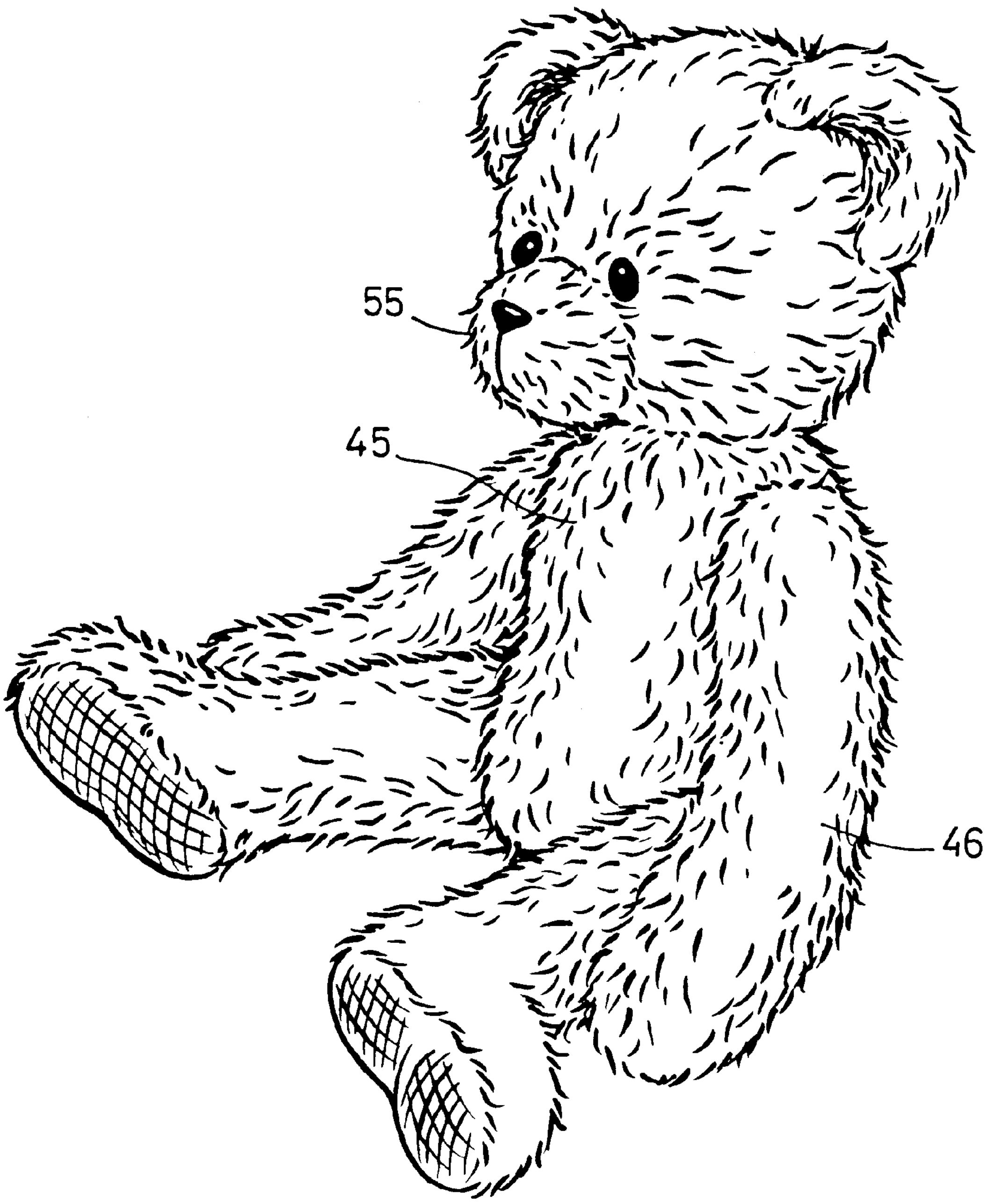
FIG. 2 is a perspective view of a ceramic object according to the present invention.
Figure 3:
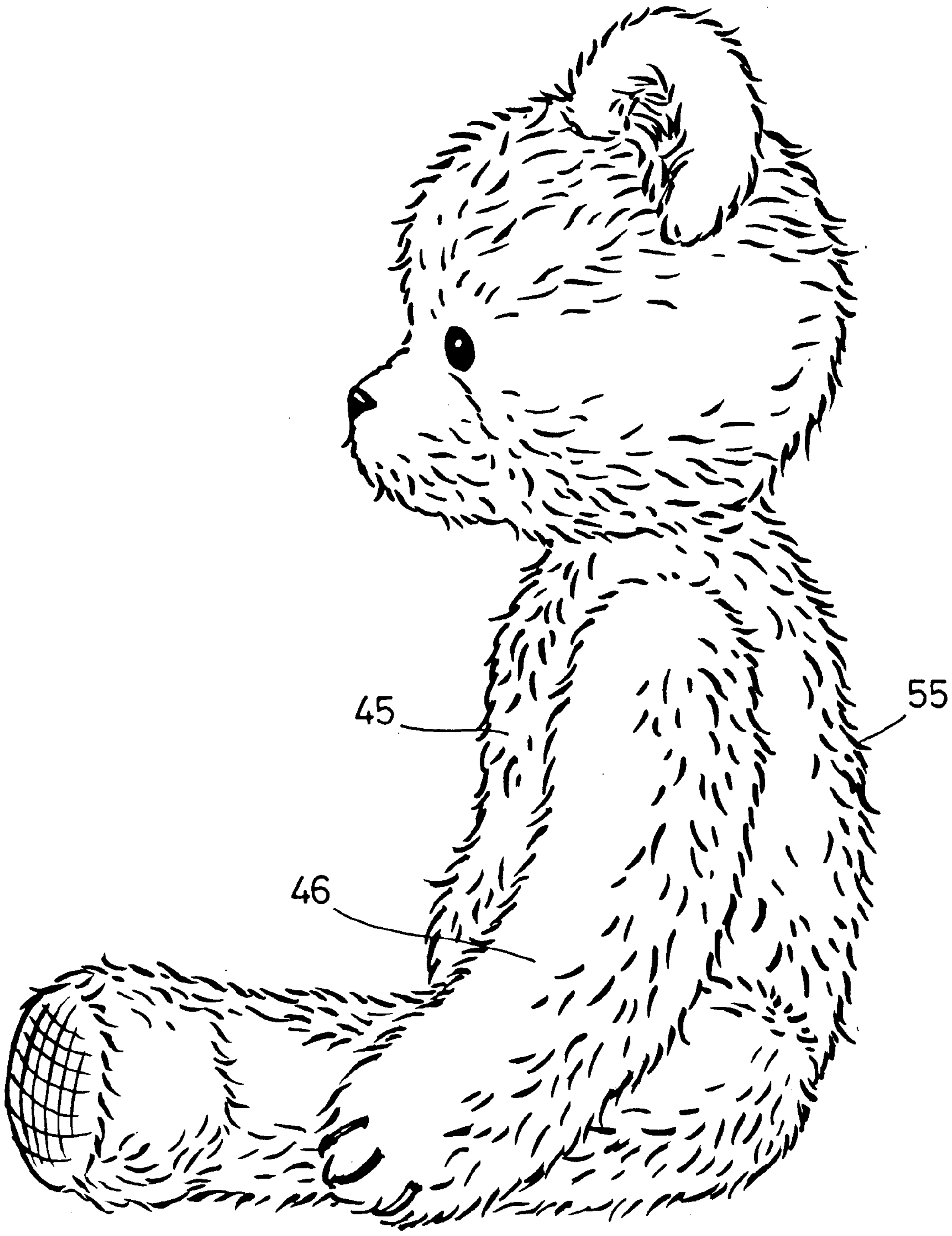
FIG. 3. is a side view of a ceramic object according to the present invention.

The aforesaid clay body used as an ornament with short undercuts on surface thereof is embodied as a small bear for instance. As shown in FIG. 1, the whole small bear cannot be molded by using a two piece type of mold assembly, i.e., the body portion 45 and the four limbs 46 must be molded by different mass-production molds respectively. After the clay bodes of the aforesaid portion and limbs are completed, they are connected together by means of slip. Conventionally, the mold assembly is made of plaster as a base substance. To mold parts by using the production mold, slip is poured into the mold assembly to let the plaster base absorb the moisture of the slip. After the clay body forms a suitable thickness, the slip is poured out of the mold assembly. As soon as the clay body is dried to an extent that demolding can be done, the clay body is taken out of the mold assembly. A small bear molded by using plaster as a mold conventionally has only flat and smooth threads to show the pile portion on the bear body. As shown in FIGS. 2 and 3, the pile portion 55 on the bear body is shown by means of a plurality of small undercuts. The conventional mold assembly, which uses plaster as base, is unable to obtain short undercuts on the clay body.

Figure 4:
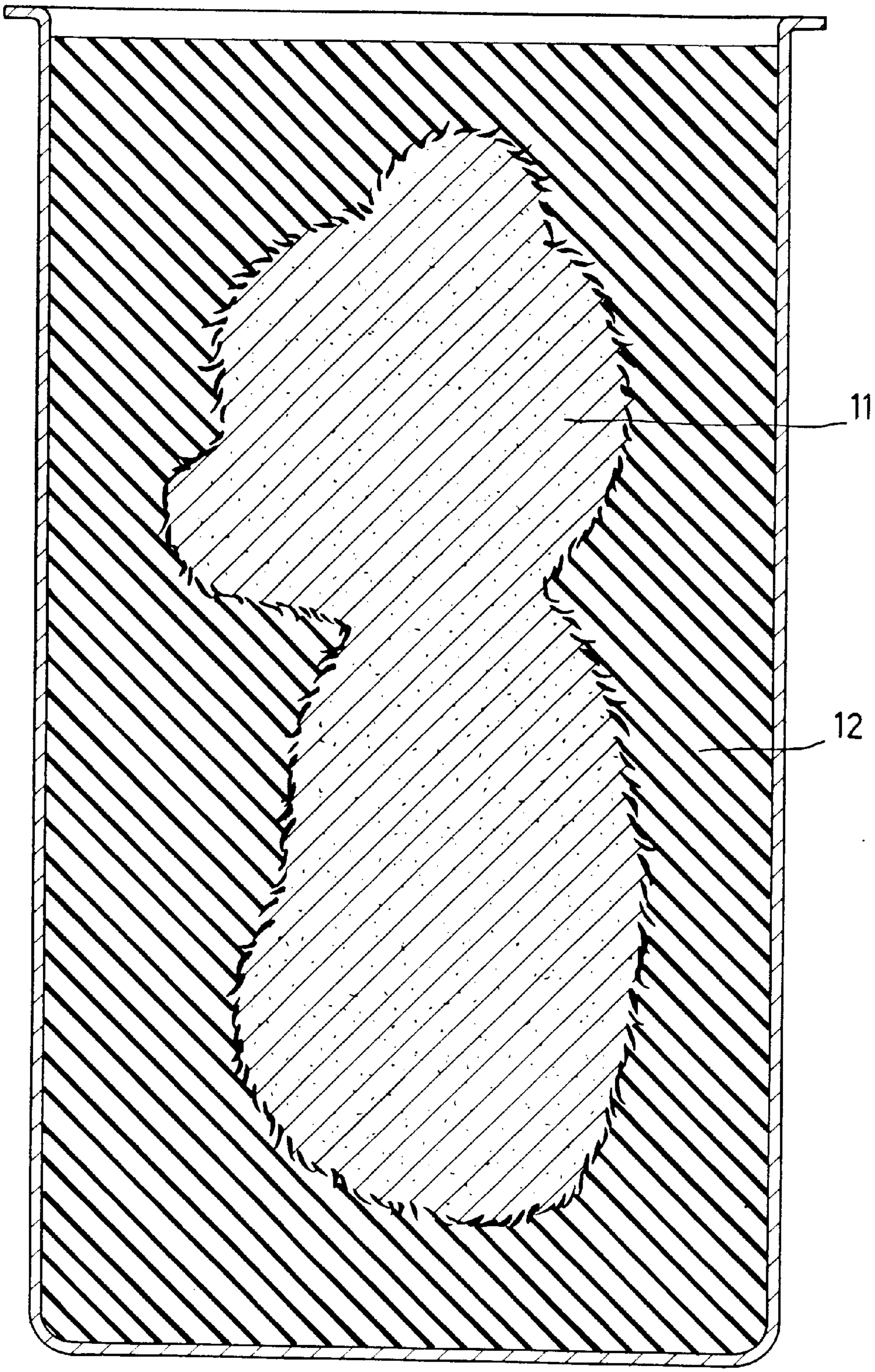
FIG. 4 is a primary resin body molded according to the present invention.

In the present invention, a small bear is used as an example to describe the method of molding a ceramic ornament, of which the surface is furnished with dense short undercuts to represent the pile portion 55 of the figurative body. After being fired at a high temperature, the small bear is just a plain clay body, which includes the body portion 45 and four limbs 46 made in different mold assemblies respectively. Then, the aforesaid parts are assembled into one piece. Each of the aforesaid assemblies is to be made through the following molding method. Then, the body portion 45 of the small bear is used as an example to provide the primary clay body 11 with dense short undercuts or fine threads, and the steps of making the same include as follows:

1. To form a resin body by means of the primary clay body 11:

As shown in FIG. 4, the primary clay body 11 with short undercuts on the surface thereof is coated with a layer of silicone, and then is put in a container, and fastened in position; the container is injected with a suitable amount of silicone until the primary clay body 11 is completely buried in the silicone. The aforesaid layer of silicone is used to prevent the surface of the primary clay body 11 from generating bubbles.

After the silicone has set, an opening is cut in the silicone, which is large enough to remove the primary clay body. As soon as the primary clay body 11 is taken out, a silicone mold assembly 12 is finished and ready for pouring and casting. The primary clay body 11 has a pouring port at a suitable position thereof, and a silicone mold assembly 12 formed also has a pouring port.

A suitable amount of resin will be poured into the silicone mold assembly 12, and as soon as the resin has set, a primary resin body 13 is completed.

Figure 5:
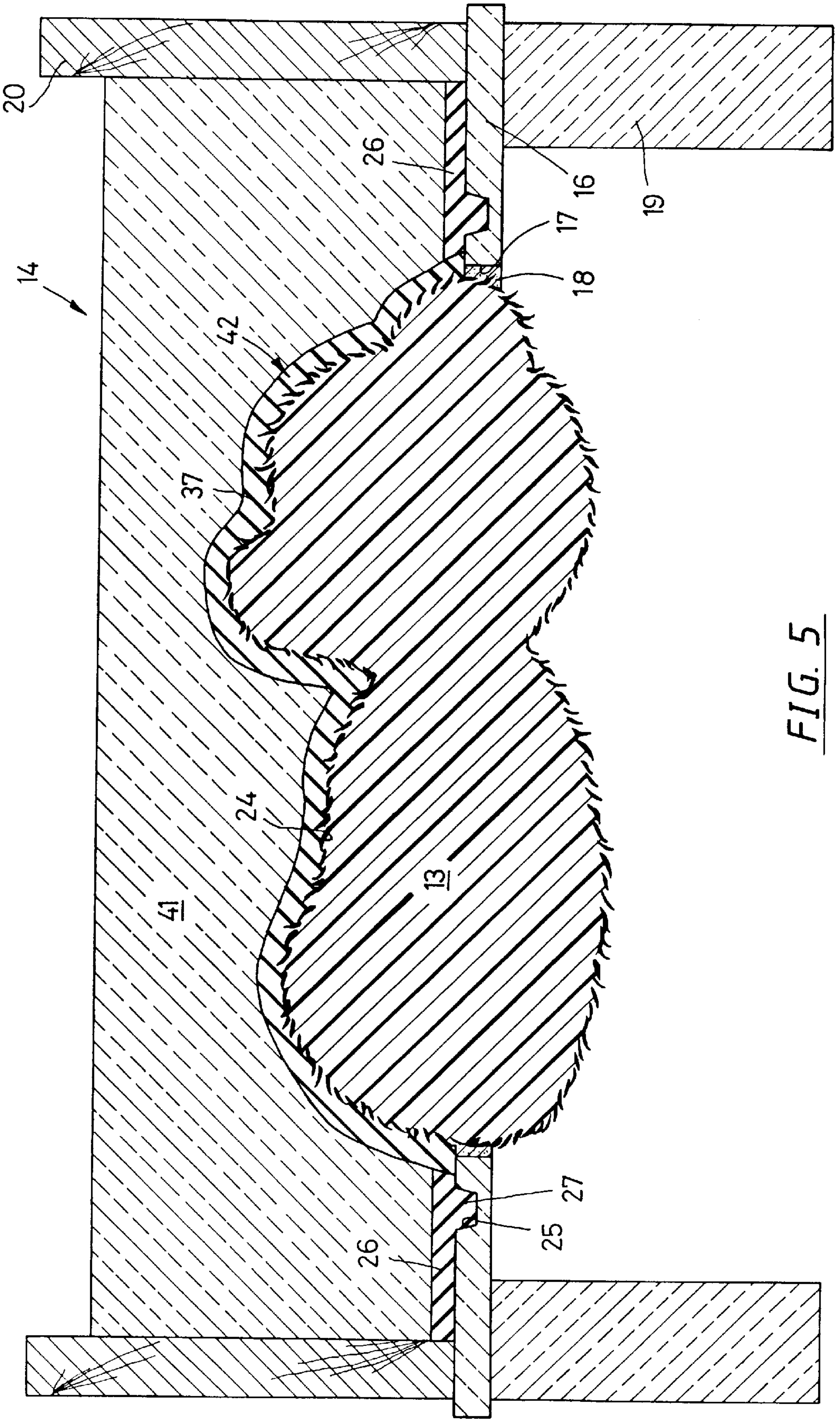
FIG. 5 is a sectional view of a silicone mold according to the present invention, showing a first silicone molding member and a bottom molding member thereof.

2. To form a silicone mold assembly by means of the primary resin body:

The primary resin body 13 is placed in the connection hole 17 of the plaster template 16 as shown in FIG. 5 such that the upper half of the primary resin body 13 is located above the straight split line of the mold. The connection hole 17 and the primary resin body 13 are sealed by means of filler 18.

The plaster template 16 is mounted flay on support blocks 19. The upper half portion of the primary resin body 13 is coated with silicone several times so as to form a layer of silicone 37 having a suitable thickness.

The periphery of the plaster template 16 is enclosed with retaining board 20 and silicone is poured into the inside space of the retaining board 20 so as to provide a suitable thickness of silicone layer 26 on the plaster template 16. After the silicone layer 26 has set, a silicone molding member 42 of the silicone mold assembly 14 is completed. Before silicone is poured on the plaster template 16, the periphery around the upper half of the primary resin body 13 is furnished with a recess hole and positioning groove 25. As soon as the silicone layer 26 has set, a positioning flange 27 is formed to surround the mold cavity 24.

A suitable plaster slip is poured over the top surface of the silicone molding member 42 within the retaining board 20. As soon as the plaster slip has set, a molding member 41 will be finished.

Figure 6:
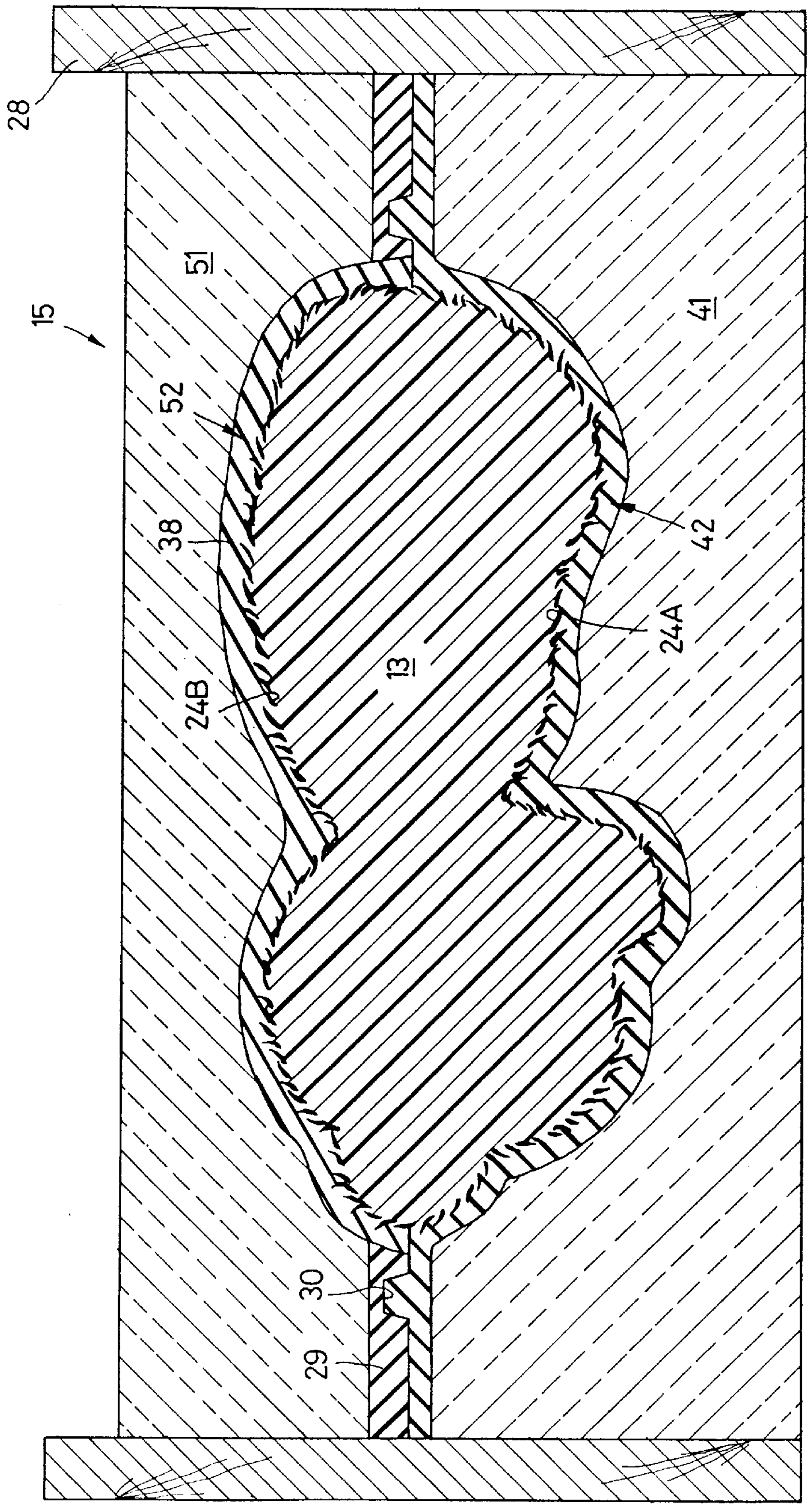
FIG. 6 is a sectional view of a silicone mold according to the present invention, showing a second silicone molding member and a bottom molding member thereof.

After the retaining boards 20 surrounding the molding member 41 are removed, the molding member 41 is inverted as shown in FIG. 6. The plaster template 16, and the filler 18 are removed from the primary resin body 13 completely.

The molding member 41 is placed on a flat board with the silicone molding member 42 facing upwards, and the upper surface of the silicone molding member 42 is coated with a demolding substance. The surface of the upper half of the primary resin body 13, as shown in FIG. 6, is coated with silicone several times until the surface of the primary resin body 13 is covered with a silicone film 38 having a suitable thickness.

Retaining boards 28 are assembled around the periphery and a suitable amount of silicone is poured in the space within the retaining boards 28 so as to form a silicone layer 29 with a thickness being equal to or slightly thicker than that of the silicone layer 26 on the silicone molding member 42. Then, a silicone molding member 52 I\of the silicone mold assembly 15 is finished. The periphery of the silicone layer 29 is furnished with a positioning groove 30 to be engaged with positioning flange 27 of the silicone mold member 42.

A suitable amount of plaster slip is poured over the top surface of the silicone molding member 52 which is surrounded and sealed with retaining boards 28. The plaster slip will become set to form into a molding member 51.

After the molding members 41, 51 and the silicone molding members 42, 52 of the two silicone mold assemblies 14 and 15 are finished respectively, the next step is to demold and split them, and to remove the retaining boards 28. Then, the molding member 41 of the silicone mold assembly 14 and the molding member 51 of the silicone mold assembly 15 are removed, but the two silicone molding members 42 and 52 around the periphery of the primary resin body 13 are left in place. Since the silicone covering the primary resin body 13 is thin, it can easily be separated from the short undercuts on the surface of the body 13.

Figure 7:
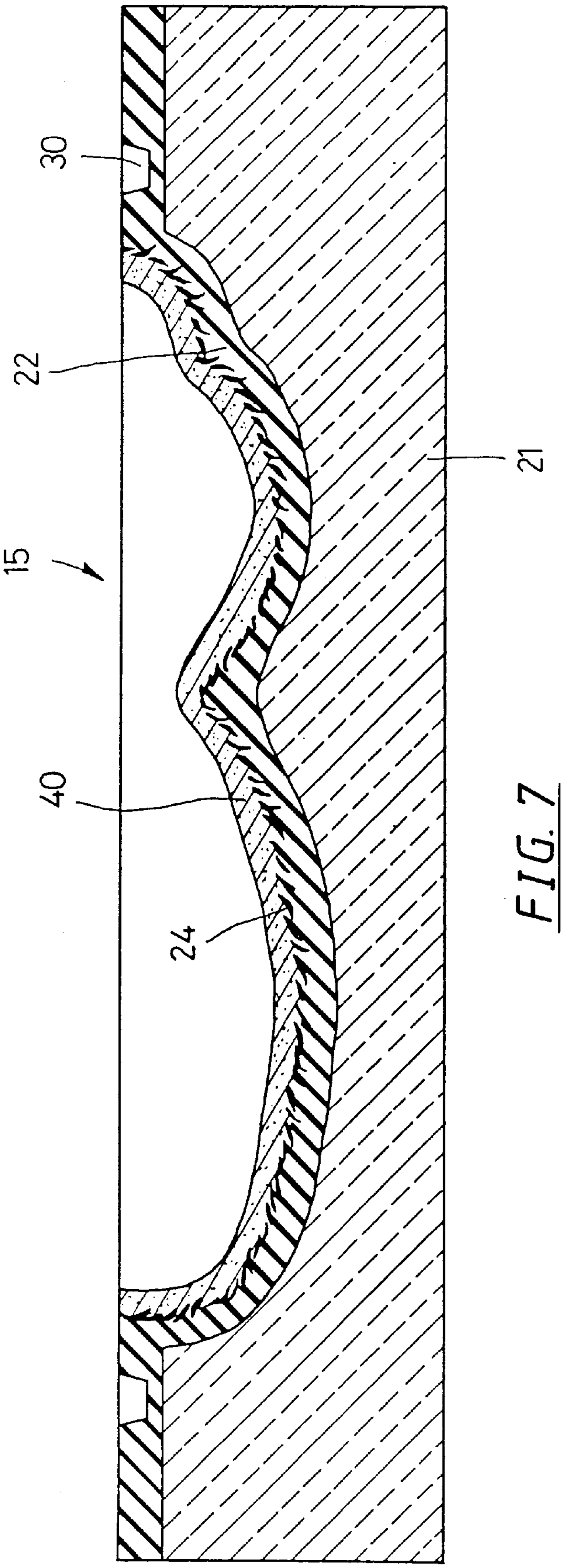

As shown in FIG. 7, the mold cavity 24 of the silicone molding member 52 of the silicone mold assembly 15 is filled with a sculpture clay 40 having a suitable and even thickness.

Figure 8:
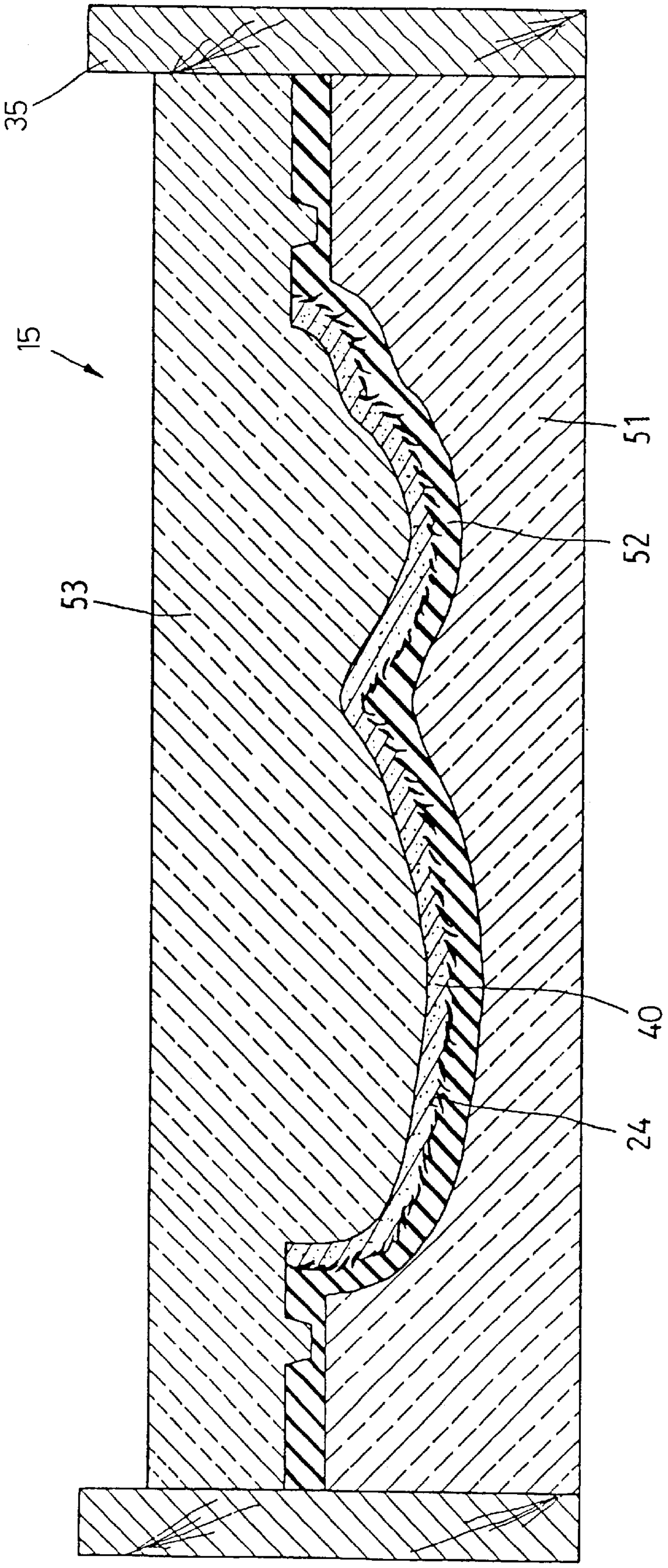
FIG. 8 is a sectional view of a first embodiment of the upper molding member in accordance with the present invention.

As shown in FIG. 8, the periphery of the molding member 51 is again surrounded and sealed with retaining boards 35, and then filled with a suitable amount of plaster slip. The molding member 53 of the silicone mold assembly 15 thus formed will be finished upon the plaster slip becoming hard.

Figure 9:
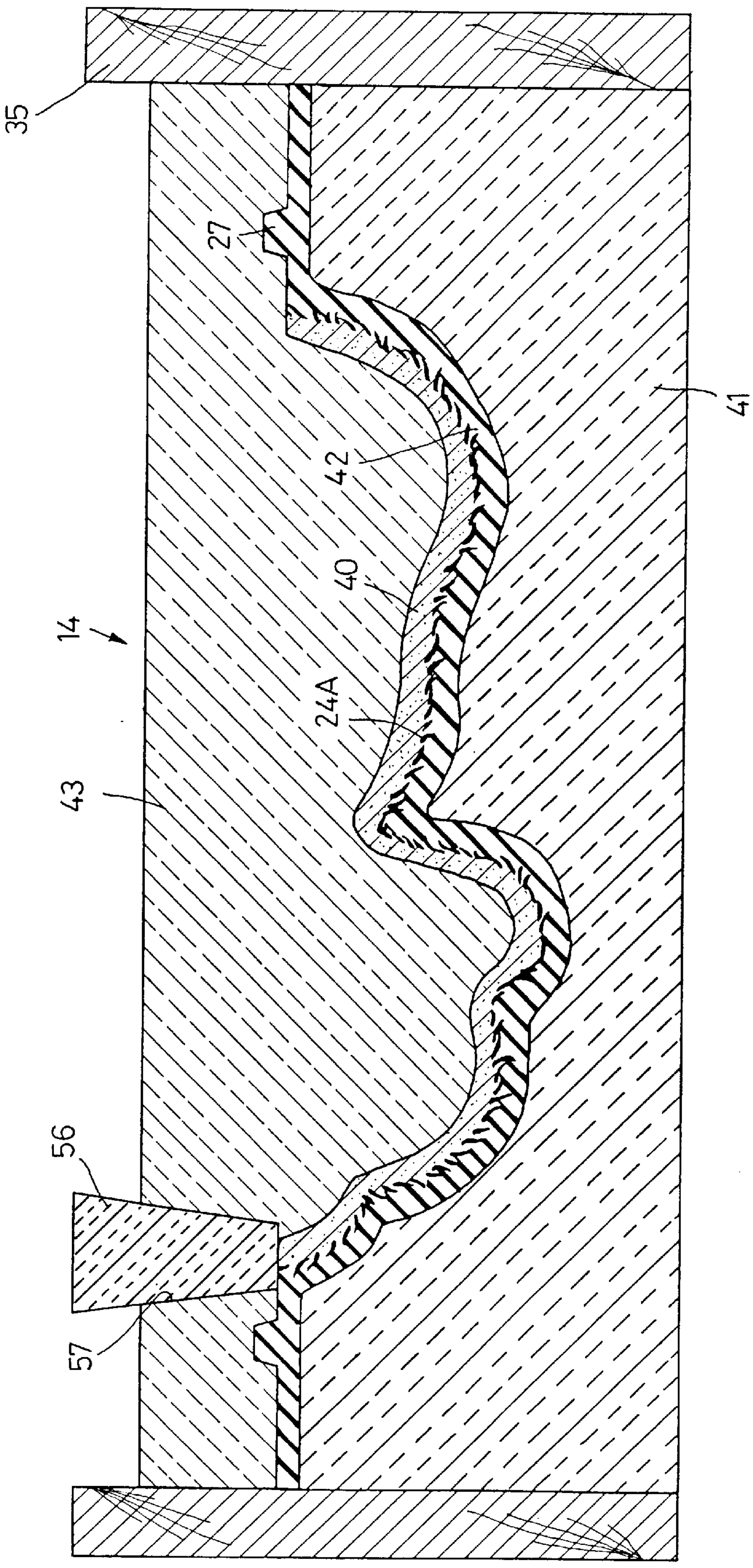
FIG. 9 is a sectional view of a second embodiment of the upper molding member according to the present invention.
Figure 10:
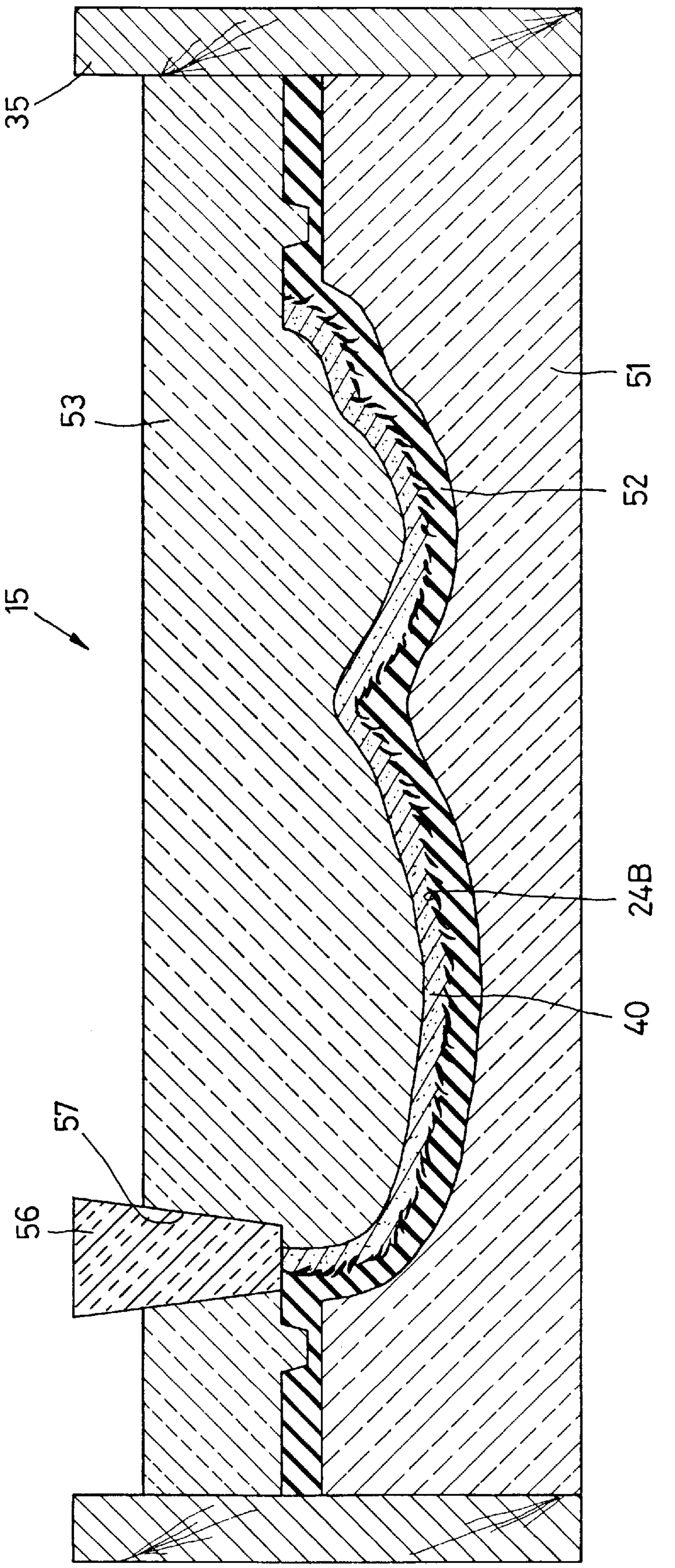
FIG. 10 is a sectional view of the upper molding member according to FIG. 9, is used with the second molding assembly.

As shown in FIGS. 9 and 10, the molding members 43, 53 of the silicone mold assemblies 14 and 15 are furnished with pouring funnels 56 respectively mounted on the opening of sculpture clay 40 so as to facilitate pouring plaster slip therein. As soon as the plaster slip becomes set, a pouring port 57 will be formed on the molding members 43, 53 and the pouring funnels 56. Then, the sculpture clay 40 in the mold cavity 24 is removed completely so as to prevent any sculpture clay 40 from being left in the mold cavity 24, and to avoid the molding of the short undercuts being affected. The pouring port 57 on the molding members 43,53 must be trimmed properly and then the silicone mold assemblies 14 and 15 are finished.

Figure 11:
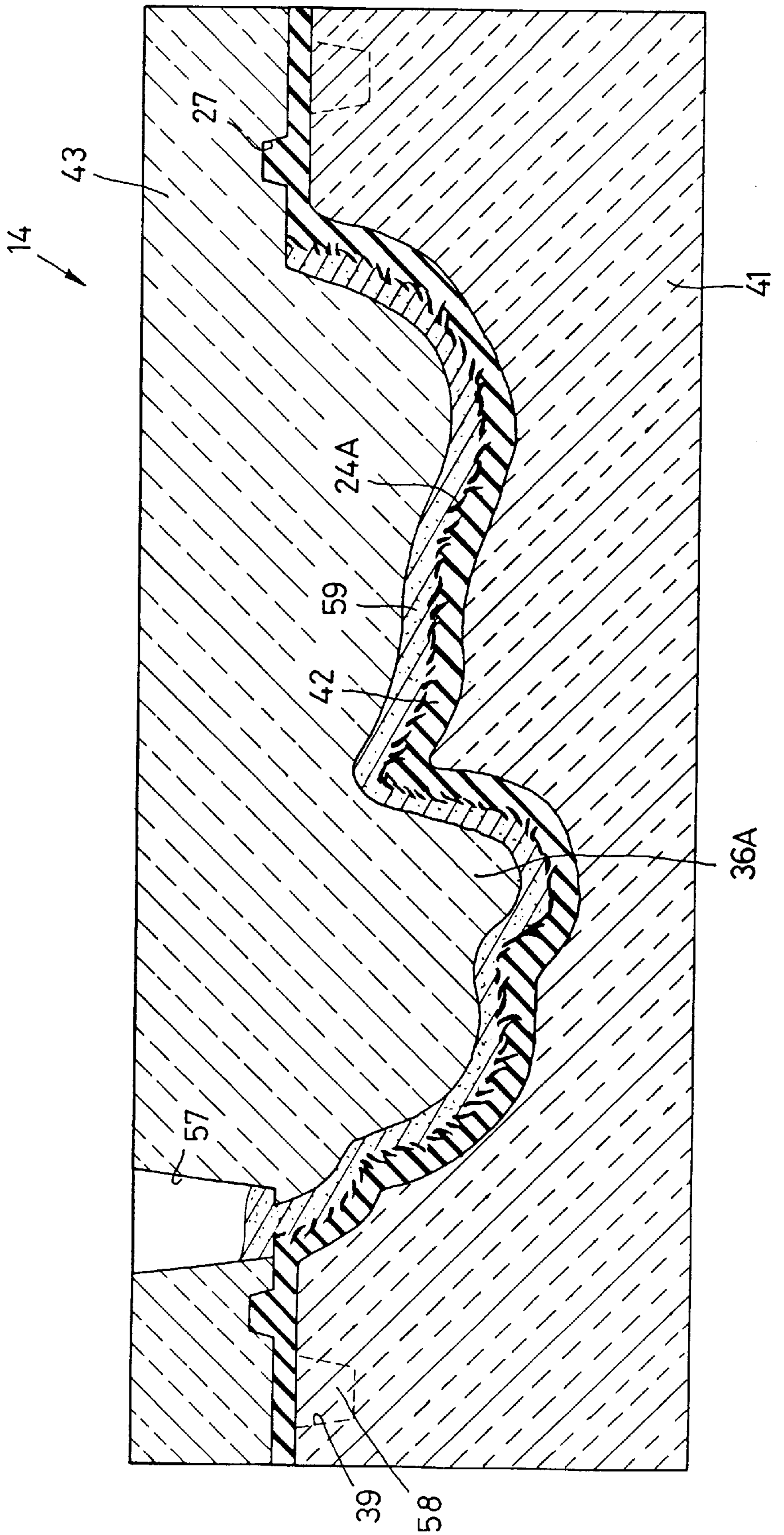
FIG. 11 is a sectional view of the present invention, showing a slip-pouring operation with the upper molding member of FIG. 9.
Figure 12:
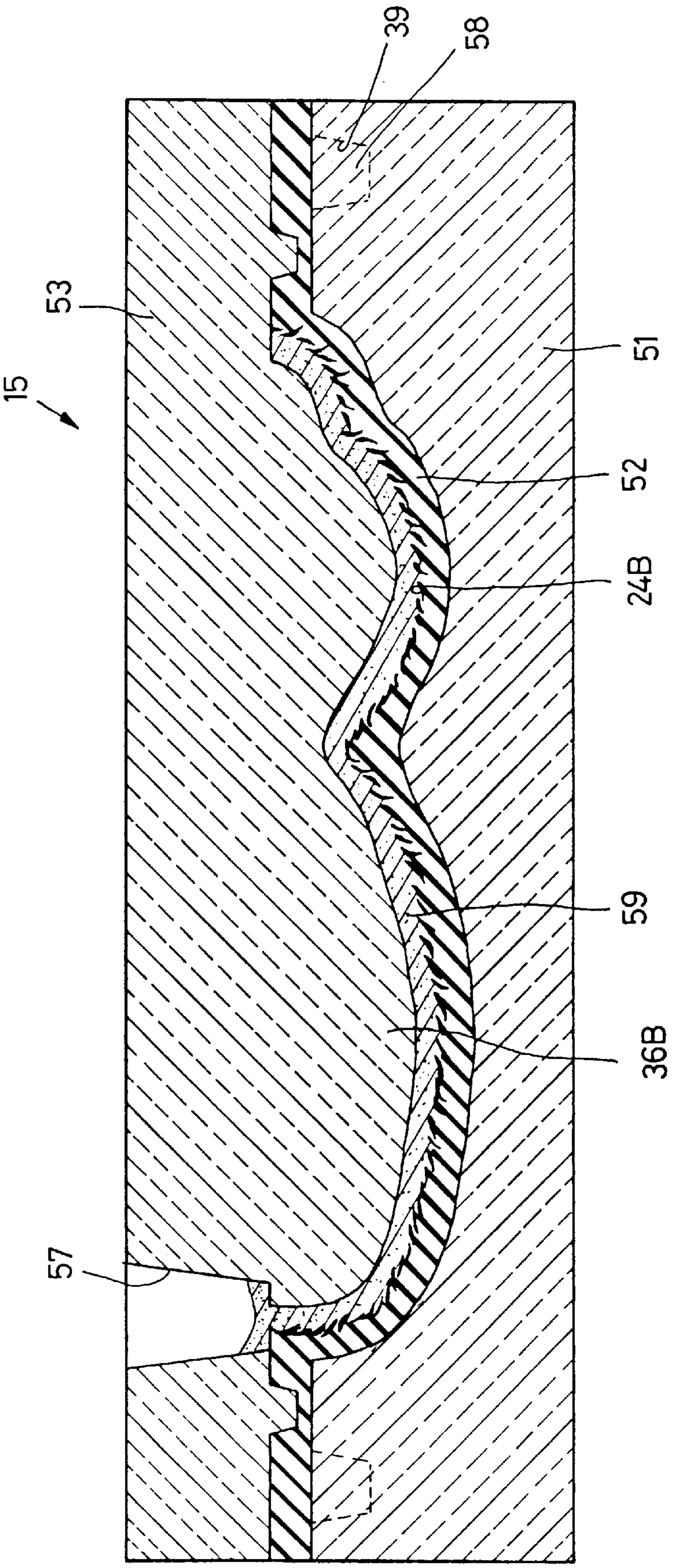
FIG. 12 is a sectional view similar to FIG. 11, showing the slip-pouring operation with the second mold assembly.

In order to have a better positioning relation between the silicone mold assemblies 14 and 15, the outer corners of the contact surface between the molding members 41, 51 and the silicone molding members 42, 52 are furnished with different recess holes 39 as shown in FIGS. 11 and 12. The recess holes 39 are filled with silicone so as to have the three members of the silicone mold assembly combined together. The silicone poured in the recess holes will be in contact with the peripheral surface of the silicone molding members 42, 52 and as soon as the silicone in the recess holes sets, it will be combined together with the surface of the silicone molding members 42, 52 so as to increase the positioning strength between the silicone molding members 42, 52 and the molding members 41, 51.

3. To mold a clay body 31 by means of a silicone mold assembly

As shown in FIGS. 11 and 12, the molding members 41, 51 of silicone mold assemblies 14 and 15 are substantially positioning molds for the silicone molding members 42, 52 into which is poured the slip via the mold cavities 24A, 24B. During demolding, the undercuts on the surface of the clay body 31 are not damaged. The molding members 43, 53 are made of plaster, and there is a given distance between inner mold blocks 36A and 36B, and the mold cavities 24A, 24B of the silicone molding members 42, 52. Since the plaster has characteristics of absorbing moisture, the moisture in the slip in the mold cavities 24A, 24B will be absorbed, and the slip will be dried to facilitate demolding the clay body, which will have a desired thickness.

Before pouring slip into the mold cavities 24A, 24B, the mold cavities 24A, 24B must be in a clean state so as to prevent any miscellaneous substance thereon affecting the molding of the undercuts. The molding members 43, 53 must also be dried properly.

Before pouring the slip, the molding members 41, 51 should be leveled on a flat board. After the silicone molding members 42, 52 are positioned properly, the mold cavities 24A, 24B are coated with a small amount of slip. Then, molding members 43, 53 and the silicone molding members 42, 52 are clamped together. If the molding members 43, 53 to be poured with slip are as shown in FIG. 8, which have no pouring ports, the amount of slip to be poured into the mold cavity 24 must be measured first. Before pouring the slip, the mold cavity 24 is coated with a small amount of slip to prevent the formation of bubbles in the undercuts after normal pouring. Since the molding members 43, 53 and the silicone molding members 42, 52 are clamped together, the slip poured into the mold cavity 24 before clamping will reach the openings of the mold cavity 24 as a result of pushing and extruding by the inner mold block 36. A tiny amount of slip might leak out, but it would not affect the clamping force of the molding members. A thin layer of slip left between the surface of the silicone molding members 42, 52 and the molding members 43, 53 will be dried by the molding members 43, 53 and be separated from the clay body 31. As shown in FIGS. 11 and 12, if the upper molding members 43, 53 of the silicone mold assemblies 14 and 15 are furnished with pouring ports 57, a tiny amount of slip is coated on the mold cavity 24 of the silicone molding members 42 and 52, and then the molding members 42 and 52 are combined and clamped together. Slip 59 is poured into the mold cavity 24 with the moisture in the slip being absorbed by the inner mold blocks 36A, 36B made of plaster. As soon as the moisture of slip 59 is dried to an extent for demolding, a half clay body having an even thickness will be finished.

Figure 13:
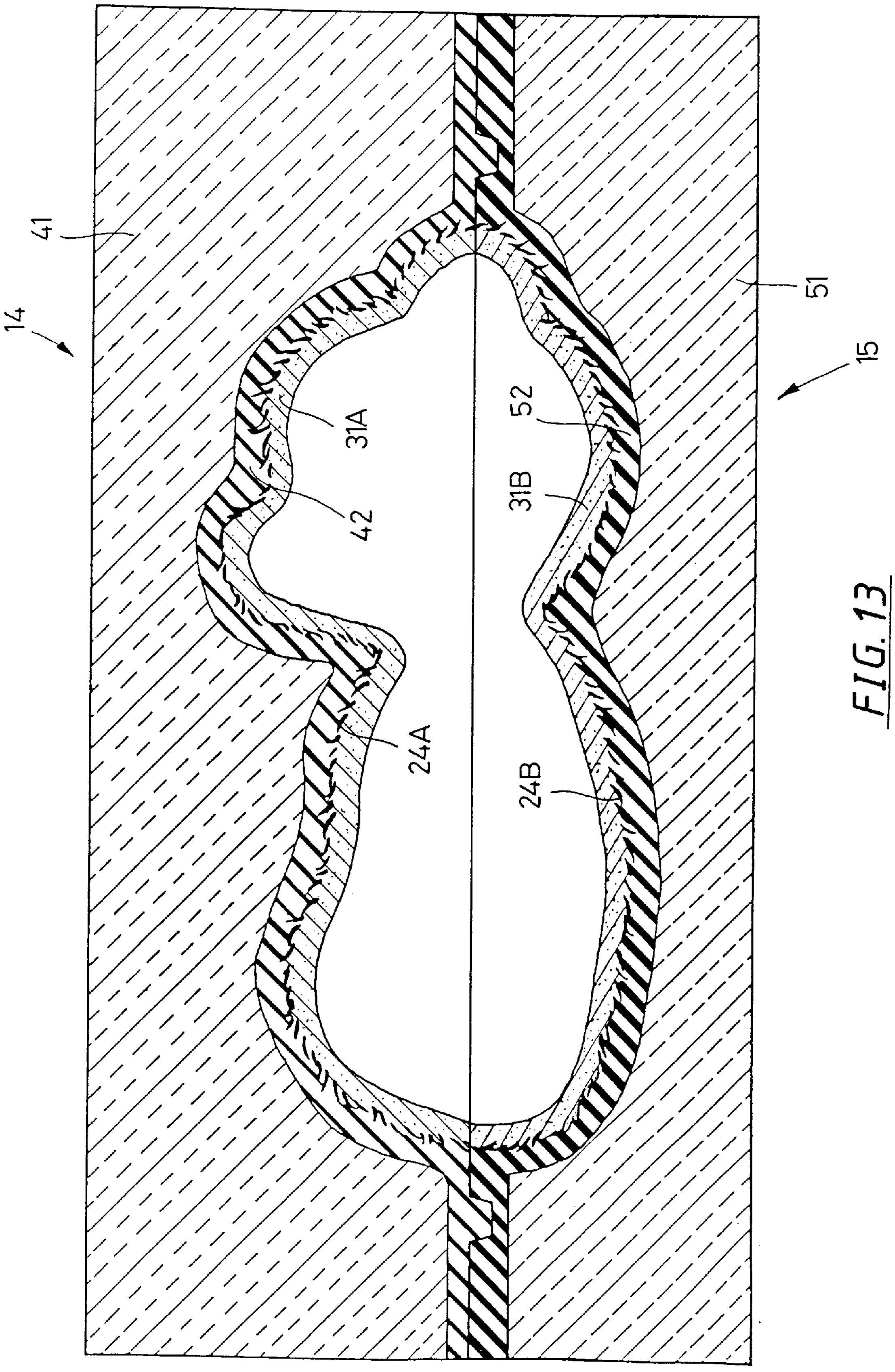
FIG. 13 is a sectional view of the present invention, showing a body in the two silicone mold assemblies being connected after coating with slip.

The molding members 43 and 53 are removed, and the slip left on the pouring ports of the aforesaid molding members are also removed. Slip is coated on the connection line between the two half clay bodies 31A, 31B in the silicone molding members 42 and 52 respectively which are then combined and clamped together as shown in FIG. 13. As soon as the slip coat is dried, the two half clay bodies 31A, 31B will be connected together as a complete figurative body.

The two molding members 41 and 51 are removed, and the clay bodies are separated from the silicone molding members 42 and 52 respectively. Once the figurative body is removed without damaging the undercuts on the surface thereof, the connection line between the bodies 31A, 31B may be trimmed manually.

As shown in FIGS. 2 and 3, the four limbs 46 of the small bear are also molded by the aforesaid method, and they are connected with the body portion 45. The connection surface thereof is coated with slip before being put in kiln for firing at a high temperature, after which a clay body with undercuts or fine threads on the surface thereof is finished.

The silicone mold assembly used for molding the play clay body with undercuts on the surface thereof is good for making ceramic ornaments from two pieces, and it can provide the figurative body of a ceramic ornament with a better positioning condition.

In making a flat type of ceramic ornament, such as a front panel sculpture of a mug, a shallow-relief ornament board, etc., the clay body has a single flat panel furnished with short undercuts or fine threads. In that case, it can be molded and poured into form with a single silicone mold assembly. The manufacturing procedures are the same as the aforesaid method, and the surface thereof can be furnished with short undercuts or fine threads.

What is claimed is:

1. A method of making a ceramic ornament having short undercuts on a surface thereof comprising the steps of:

a) forming a primary clay body in the shape of at least a portion of the ornament having the short undercuts on a surface;

b) molding silicone around the primary clay body;

c) removing the primary clay body after the silicone has set to thereby form a silicone mold having the undercuts therein;

d) molding a resin material in the silicone mold to form a primary resin body having the short undercuts on a surface;

e) placing the primary resin body in a template such that a first portion of the surface of the primary resin body faces upwardly;

f) coating the upwardly facing first portion of the surface of the primary resin body with a predetermined thickness of silicone to form a first silicone molding member;

g) covering an exposed surface of the first silicone molding member with plaster slip and allowing the slip to harden to form a first molding member;

h) inverting the first molding member such that a second portion of the surface of the primary resin body faces upwardly;

i) removing the template from the first molding member;

j) coating the upwardly facing second portion of the surface of the primary resin body with a predetermined thickness of silicone to form a second silicone molding member;

k) covering an exposed surface of the second silicone molding member with plaster slip and allowing the slip to harden to form a second molding member;

l) separating the first and second molding members and removing the primary resin body therefrom such that each molding member has a molding surface;

m) coating the molding surface of each molding member with a predetermined thickness of sculpture clay;

n) covering the sculpture clay with plaster slip in each molding member and allowing the slip to harden to form first and second upper molding members;

o) removing the sculpture clay such that each molding member has a molding cavity bounded by the molding surface and the upper molding member;

p) molding ceramic slip in the molding cavities and allowing the slip to harden to form portions of the ceramic ornament;

q) removing the first and second upper molding members;

r) coating a portion of at least one of the portions of the ceramic ornament with a slip layer;

s) placing the first and second molding members together such that the portions of the ceramic ornament are in contact with each other and are affixed together when the slip layer hardens; and, t) removing the first and second molding members.

2. The method of claim 1 comprising the additional steps of removing the upper molding members from the molding members prior to removing the sculpture clay.

3. The method of claim 2 wherein the step of molding ceramic slip comprises the steps of:

a) placing a predetermined quantity of ceramic slip on the molding surface of the first and second molding members; and, b) clamping the associated upper molding members onto the first and second molding members such that the ceramic slip fills the molding cavities.

4. The method of claim 1 comprising the additional step of forming a pouring port in the upper molding members in communication with the respective molding cavity.

5. The method of claim 4 wherein molding the ceramic slip comprises the step of pouring the ceramic slip through the pouring port until the ceramic slip fills the associated molding cavity.

6. The method of claim 1 comprising the additional steps of:

a) forming a positioning groove on one of the first and second silicone molding members; and, b) forming a positioning flange on the other of the first and second silicone molding members whereby engagement of the positioning flange in the positioning groove locates the first and second silicone molding members relative to each other.

* * * * *